United States Patent [19]
Strausbaugh et al.

[11] Patent Number: 5,489,141
[45] Date of Patent: Feb. 6, 1996

[54] PIVOTABLE AND SLIDABLE STORABLE SEAT

[75] Inventors: Donald E. Strausbaugh, New Washington; Scott K. Hiler, New Washington; Robert L. Knapp, Mansfield; Kenneth A. Fox, Bloomvile, all of Ohio

[73] Assignee: The C. E. White Co., New Washington, Ohio

[21] Appl. No.: 93,696

[22] Filed: Jul. 20, 1993

[51] Int. Cl.⁶ .................................................. B60N 2/30
[52] U.S. Cl. ...................... 297/335; 297/14; 297/378.14
[58] Field of Search ........................ 297/14, 335, 344.11, 297/378.12, 341

[56] References Cited

U.S. PATENT DOCUMENTS

| | | |
|---|---|---|
| 1,250,155 | 12/1917 | Emond . |
| 1,639,371 | 8/1927 | Freeman . |
| 1,640,640 | 8/1927 | Bourgon . |
| 1,649,608 | 11/1927 | Matthews . |
| 1,668,213 | 5/1928 | Landine . |
| 2,396,039 | 3/1946 | Burton et al. . |
| 2,523,960 | 9/1950 | Liljengren et al. . |
| 2,670,987 | 1/1952 | Walsh . |
| 2,673,593 | 3/1954 | Hendrickson ................. 297/378.12 X |
| 3,131,964 | 5/1964 | Reed . |
| 4,101,169 | 7/1978 | Muraishi et al. ........................ 297/341 |
| 4,458,939 | 7/1984 | Höhn ..................................... 297/14 X |
| 4,993,666 | 2/1991 | Baymak ................................ 297/14 X |
| 5,069,503 | 12/1991 | Martinez ......................... 297/378.12 X |

FOREIGN PATENT DOCUMENTS

| | | | |
|---|---|---|---|
| 397304 | 8/1908 | France . | |
| 402274 | 8/1909 | France ................................. 297/14 |
| 464306 | 1/1914 | France ................................. 297/341 |
| 214839 | 10/1909 | Germany ............................. 297/335 |
| 8067526 | 4/1983 | Japan ............................... 297/344.11 |
| 0081829 | 4/1986 | Japan ................................... 297/14 |
| 243121 | 11/1925 | United Kingdom ................... 297/14 |

*Primary Examiner*—Peter M. Cuomo
*Assistant Examiner*—David E. Allred
*Attorney, Agent, or Firm*—Finnegan, Henderson, Farabow, Garrett & Dunner

[57] ABSTRACT

A storable seat includes a seat base, a support member for supporting the base in a first plane above and generally parallel to a floor, a sliding assembly connected to the support member and the base and permitting the base to slide relative to the support member in the first plane, and a pivoting assembly connected to the support member and the base and permitting the base to pivot from the first plane to a second plane substantially perpendicular to the first plane. A seat back is pivotably connected to the base at a hinge point and locked in a fixed position, and a pivotable leg is pivotably connected to the base. The seat can be easily stowed in a storage position against a wall.

20 Claims, 4 Drawing Sheets

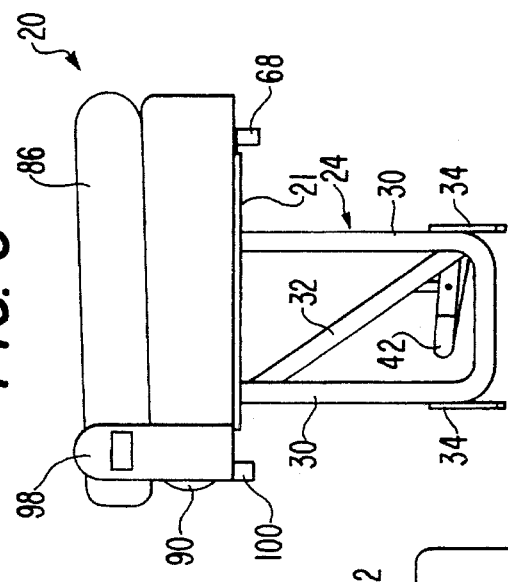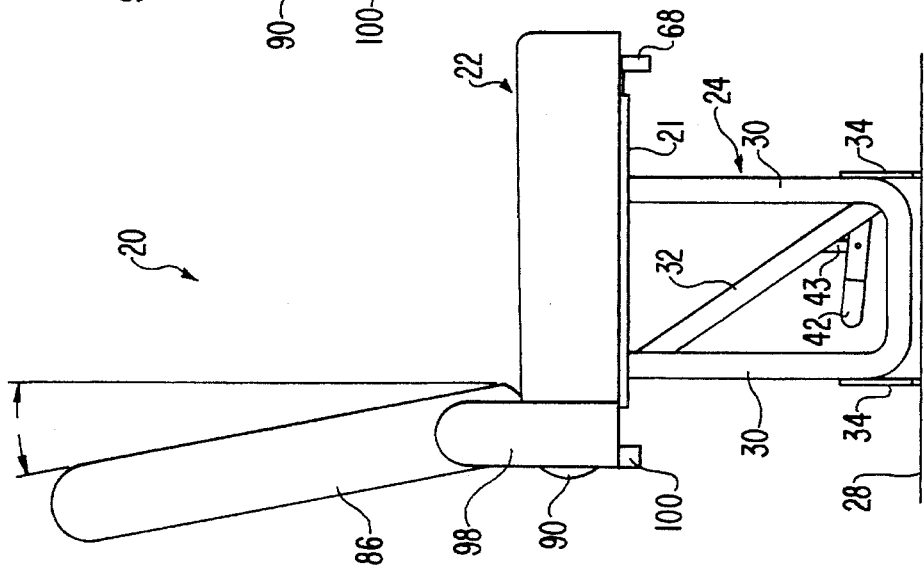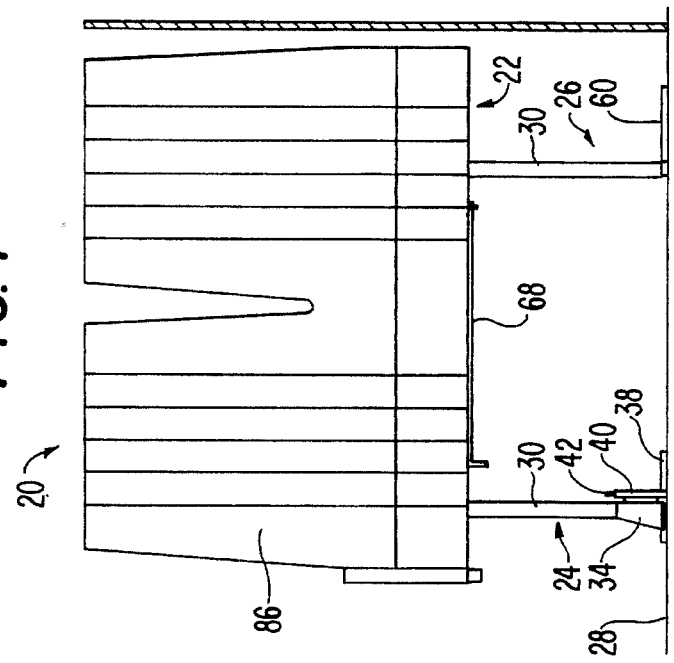

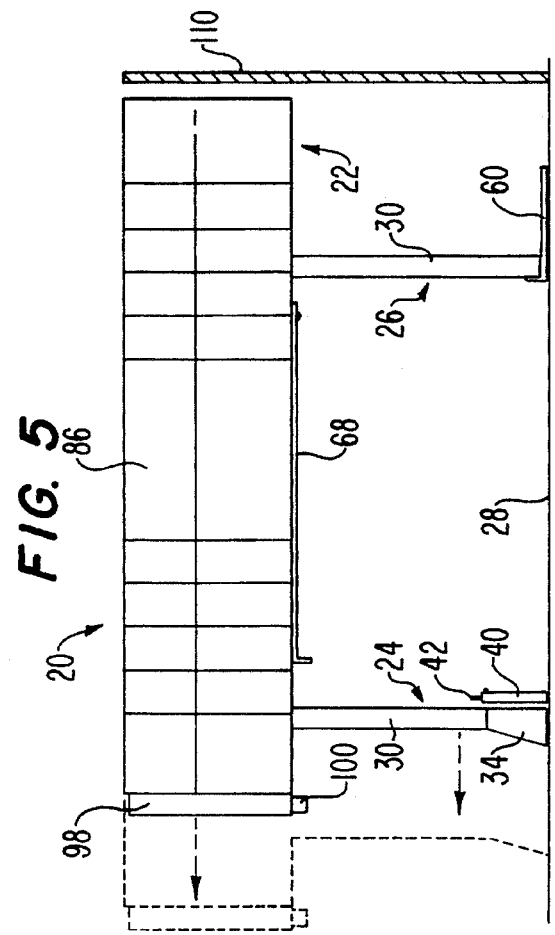
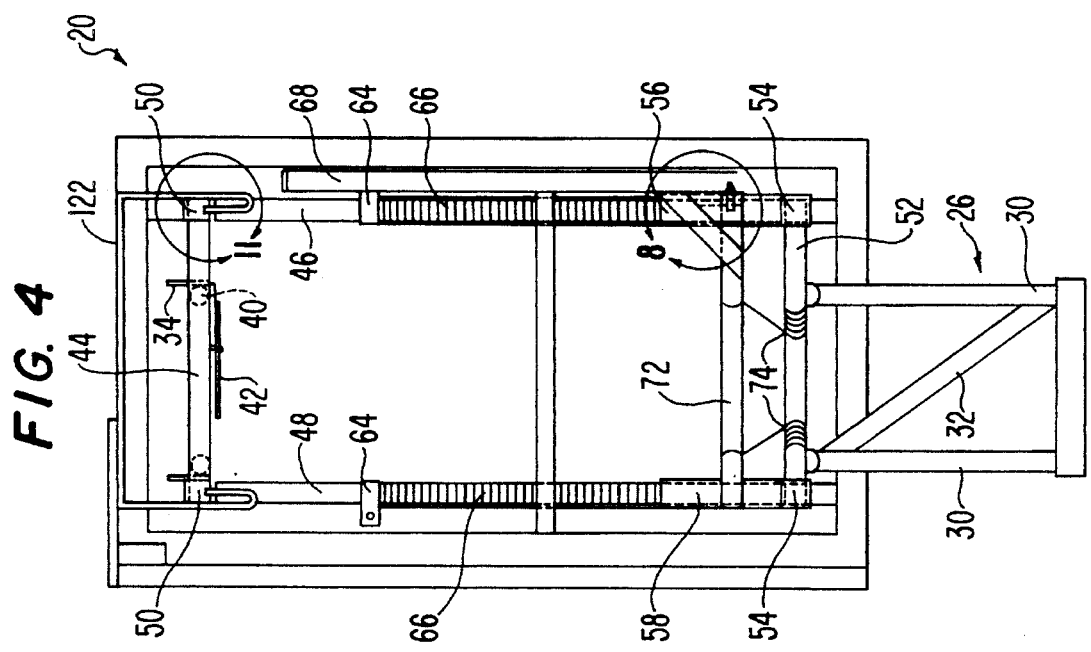

5,489,141

PIVOTABLE AND SLIDABLE STORABLE SEAT

BACKGROUND OF THE INVENTION

1. Field of the Invention

The present invention relates to a storable seat. More particularly, the present invention relates to storable seats for use in vehicles such as buses and vans.

2. Description of the Related Art

Storable seats have been used in vehicles when there is a need to have flexibility between transporting seated passengers and transporting cargo. In addition, federal law requires a certain amount of space be allocated in public modes of transportation to accommodate persons with disabilities confined to wheelchairs. If there are no passengers in wheelchairs, the space left available for them is left unoccupied. Obviously, this is an inefficient use of space. Therefore, it is desirable to have a passenger seat which can be used to seat ambulatory passengers, but which may be quickly put in a stored position in case a person in a wheelchair desires to ride in the vehicle.

The space for putting the seat in a stored position is usually confined by a fixed structure such as a wall. In addition, time is usually limited due to schedules which the bus or van must abide by. Therefore, it is desirable to have a storable seat which needs little room for storing, is quick to change over from either a seating position to a stored position or vice-versa, and is comfortable in use.

The prior art fails to adequately solve these and other problems and needs. For example, U.S. Pat. No. 2,523,960 to Liljenren et al. shows a seat which has a relatively limited use due to its fixed attachment to the wall. In addition, the attachment of the seat to the wall places constraints on comfort and space. Other seats in the prior art likewise fail to satisfy the need for a storable seat which is comfortable, has a quick set-up time, occupies as little space as possible, and is easy to change over in a confined space.

SUMMARY OF THE INVENTION

Accordingly, the present invention is directed to a storable seat that substantially obviates one or more of the problems due to limitations and disadvantages of the related art.

To achieve the advantages of the invention and in accordance with the purpose of the invention, as embodied and broadly described herein, the invention comprises a storable seat including a seat base, a support member for supporting the base in a first plane above and generally parallel to a floor, a sliding assembly interconnecting the support member and the base and permitting the base to slide relative to the support member in the first plane, and a pivoting assembly interconnecting the support member and the base and permitting the base to pivot from the first plane to a second plane substantially perpendicular to the first plane.

Preferably, the sliding assembly includes tubes to slidably accept the base. The sliding assembly also includes a spring-biased rod having a first aperture, a pin penetrating the first aperture to hold the spring-biased rod relative to the support member, and a release member connected to the pin for pulling the pin from the first aperture and allowing the base to slide.

Preferably, the support member includes a fixed leg fixedly mounted to the floor. A pivotable leg preferably is pivotably connected to the base and is selectively lockable in a position substantially perpendicular to the base or substantially parallel to the base. A floor plate is mounted on the floor and the pivotable leg engages and locks into the floor plate. Preferably, the pivotable leg includes an actuator and a plunger for unlocking and disengaging the pivotable leg from the floor plate.

In another aspect, the invention includes a seat back pivotably connected to the base at a hinge point and locked in a fixed position. A lever unlocks the seat back and permits the back to pivot about the hinge point to a third plane substantially parallel to the first plane.

It is to be understood that both the foregoing general description and the following detailed description are exemplary and explanatory only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings, FIG. 1 is a front elevation view of an embodiment of the present invention;

FIG. 2 is a side elevation view of the embodiment shown in FIG. 1;

FIG. 3 is a side elevation view of the embodiment of FIG. 1 in a folded position;

FIG. 4 is a side elevation view of the embodiment of FIG. 1 after being folded and pivoted;

FIG. 5 is a front elevation view of the folded embodiment shown in FIG. 3;

DESCRIPTION OF THE PREFERRED EMBODIMENT

Reference will now be made in detail to the present preferred embodiment of the invention, examples of which are illustrated in the accompanying drawings. Wherever possible, the same reference numbers will be used throughout the drawings to refer to the same or like parts.

Figure 7:
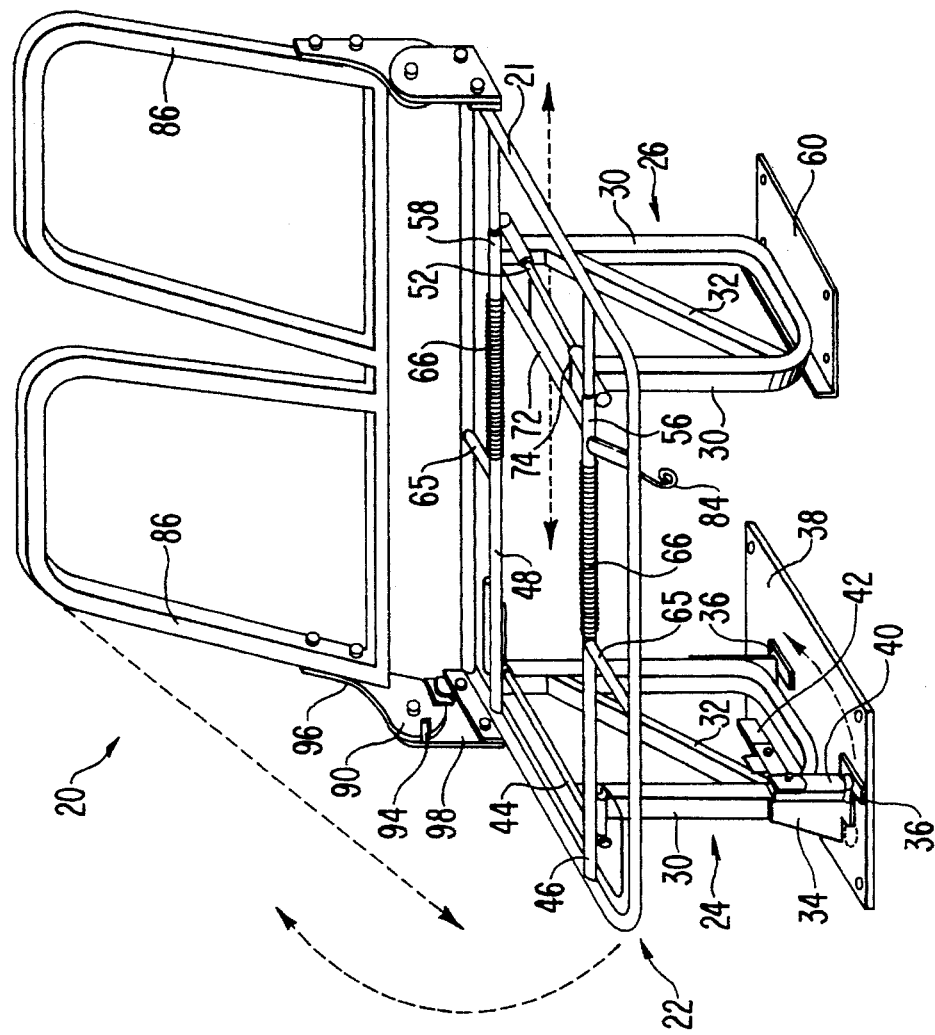
FIG. 7 is a perspective view of an embodiment of the present invention.

A storable seat, as embodied herein and shown in FIGS. 1–7, is designated generally by reference numeral 20. The storable seat includes a substantially rectangular seat base 22 (including a cushion) for supporting a person using the seat 20. The base 22 may be either a single piece or multiple piece structure and may be made from a variety of materials. As shown in FIG. 7, the base 22 in the illustrated embodiment includes a generally rectangular, tubular outer frame 21 and further includes first and second rods 46, 48 extending laterally across the frame 21 from one side of the frame 21 proximate to a fixed leg 26 to the opposite side of the frame 21 proximate to a pivotable leg 24. The tubular outer frame 21 preferably is made from carbon steel, and the rods 46, 48 are preferably made from stainless steel to provide a strong yet lightweight base to which a cushion is attached. The seat can be structured and designed to hold one or several passengers.

Figure 6:
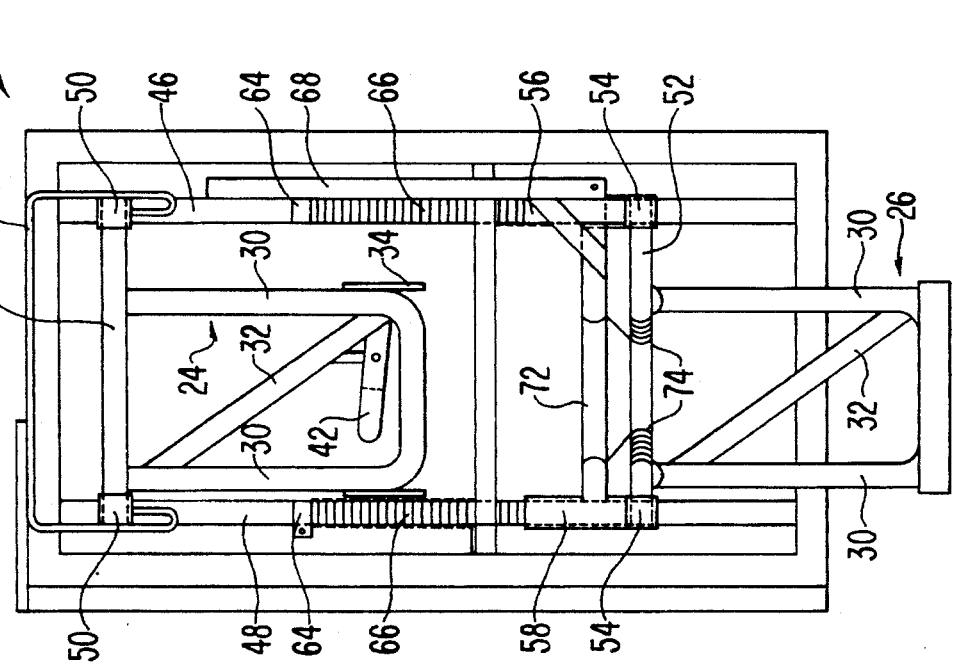
FIG. 6 is a side elevation view of the embodiment of FIG. 1 after being folded, pivoted, and pushed down into a storage position.

As shown in a first embodiment in FIGS. 4 and 6, two bands 64 are secured around the circumference of first and second rods 46, 48 at a point approximately in the middle between the sides of the frame 21. These bands 64, as explained more fully below, provide a surface against which coiled springs rest. In a second embodiment shown in FIG. 7, two support beams 65 take the place of the bands 64 in the first embodiment. The support beams 65 add to the overall strength of the base 22 and also provide a surface against which coiled springs rest.

As shown in FIGS. 1, 2, and 7, the base 22 is supported in a plane above and generally parallel to a floor 28 by the pivotable leg 24 and the fixed leg 26, functioning as a support member Preferably, each of the legs 24, 26 comprises two generally parallel struts 30 joined by a foot at one common end so as to form a U-shape. Other types and shapes of legs can also be used. In the illustrated embodiment, the struts 30 are reinforced by a diagonal brace 32 extending diagonally from an upper end of one strut 30 to a lower end of the other strut 30. Again, the leg members are preferably made from carbon steel so that the legs are strong and yet relatively light in weight.

The upper ends of the struts 30 of the pivotable leg 24, that is, the ends opposite to the foot, are joined by a first lateral bar 44. The first lateral bar 44 is connected to the first and second rods 46, 48 by a pair of first ears 50, one fastened to each of the rods. The first ears 50 include cylindrically shaped openings into which the first lateral bar 44 rotatably resides. As such, the pivotable leg 24 is allowed to swing or pivot within the first ears 50 from a vertical direction, when it is supporting the seat base 22, upward to a retracted position toward the fixed leg 26, and against the seat base 22.

Figure 11:
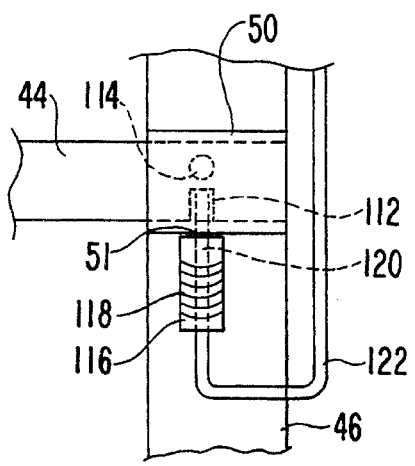
FIG. 11 is an enlarged fragmentary cross-section of the portion within the sight circle 11—11 of FIG. 4.

The pivotable leg 24 is lockable in either the vertical position or the retracted position. As shown in FIG. 11, each opposing end of first lateral bar 44 includes first and second bores 112, 114 located orthogonally with respect to each other. Each first ear 50 includes an opening 51 or hole which is aligned with the first bore 112 when the pivotable leg 24 is in a vertical position and the second bore 114 when the pivotable leg 24 is in a retracted position. Fixed to each of first and second rods 46, 48 is a sleeve 116 for holding a spring 118 and a locking pin 120 for locking the pivotable leg in either the vertical position or horizontal position. The locking pin 120 is part of an arm member 122. Arm member 122 is generally a squared C-shape with ends looped back on themselves, and the base of the arm member 122 extends the length of the first lateral bar 44 (see FIGS. 4 and 6). Each looped back end resides in one of the sleeves 116 and ends with the pin 120 penetrating the opening 51 of each of the first ears 50 and one of the first and second bores 112, 114, depending upon the position of the pivotable leg 24. A spring 118 resides in each of the sleeves 116 to bias the pin 120 through the opening 51 and toward the first and second bores 112, 114.

The pivotable leg 24 is pivoted from the vertical position (when it is perpendicular to and supporting the base 22) to the retracted position (when it is generally parallel to the base 22) as follows: In the vertical position, each of the pins 120 are biased inwardly by springs 118 into each of the first bores 112 of the first lateral bar 44. The operator pushes the arm member 122 on the base of the C-shape toward the direction of the first lateral bar 44. This motion pulls each of the pins 120 against the bias of the spring 118 and out of the first bore 112. The operator then rotates the pivotable leg 24 toward the retracted position, that is, toward the base 22. When the pivotable leg 24 reaches the retracted position, each of the pins 120 are respectively snapped into each of the second bores 114 by the constant bias of the springs 118. To pivot the leg from the retracted to the vertical position, the same steps are followed. That is, the arm member 122 is pushed toward the first lateral bar 44 against the bias of the springs 118 to pull each of the pins 120 out of the second bore 114. The pivotable leg 124 is pivoted toward the vertical position until the pins 120 snap into the first bores 112.

In accordance with the invention, the pivotable leg 24 is releasably lockable into a floor plate 38 mounted on the floor. As shown in FIG. 7, the floor plate 38 is rectangular in shape and includes two T-shaped slots 36 generally aligned with the two parallel struts 30. The plate 38 may be either surface mounted on top of the floor mat or flush mounted with the floor mat. If surface mounted, slots are carved out of the floor mat, and the plate 38 is bolted into the floor mat in a position so that the T-slots 36 in the plate 38 are aligned with the slots carved into the floor mat. If the plate 38 is flush mounted, a recess for the plate 38 and slots is carved out of the floor mat. As such, the plate 38 may be bolted into the floor while resting flush with the floor. Other ways of locking the pivotable leg 24 into the floor may be used. For example, the center portion of the plate 38 may be raised relative to its outer edges, so that there is room for a structure to slide beneath the plate 38 at the T-shaped slots.

As shown in FIG. 7, the pivotable leg 24 includes a pair of generally flat trapezoidal plates 34 attached to the outer sides of each strut 30. Each of the plates 34 include a narrow open-ended slot found at its distal end most proximate the floor. The slots are shaped so as to form fingers which can extend into the T-slot 36 in the first floor plate 38 mounted to the floor by bolts or any suitable fastener. As shown in FIG. 7, a spring-biased plunger 40 is attached to one of the plates 34. In one embodiment, a foot actuator 42 is pivotably connected at one end to the plunger 40. The foot actuator is also pivotably connected to the diagonal brace 32 by a connector 43 (see FIGS. 2 and 7). The foot actuator may also be attached to one of the struts rather than the brace. For example, it is presently preferred that the foot actuator 42 be connected to the strut most proximate to the rear portion of the base 22 to allow more room for a foot to move between the actuator 42 and the diagonal brace 32. In addition, in the present preferred embodiment, only a single trapezoidal plate 34 is attached to one of the struts instead of a pair of trapezoidal plates. When a single trapezoidal plate 34 is used, then, obviously, the floor plate 38 would require only a single T-slot 36.

The design of the pivotable leg 24 with the floor plate 38 permits the leg to be selectively locked in place relative to the floor. To lock the leg in place, the fingers of each plate 34 are placed in the T-slots 36 in the first floor plate 38, the fingers are then slid into locking segments, while the plunger 40 is spring biased into the upper part of T-slot 36. To disengage the pivotable leg 24 from the first floor plate 38, the foot actuator 42 is depressed to thereby pull against the bias of the spring and pull the plunger 40 out of the T-slot 36. The pivotable leg 24 can then be partially pivoted in a direction toward the fixed leg 26 to release the fingers in the plates 34 from the T-slots of the floor plate 38. The pivotable leg 24 could be locked into the first floor plate 38 by some construction other than T-slots and a spring-biased plunger. The pivotable leg 24, for example, could include a variety of latches to releasably mount it to the floor.

The fixed leg 26 serves as a fixed support for the seat. The leg 26 includes a second lateral bar 52 connecting the upper ends of struts 30. Each end of the second lateral bar 52 rotatably resides in one of a pair of second ears 54. Each second ear 54 is cylindrically shaped and is identical to the structure of first ears 50 (shown in FIG. 11) except that there is no opening 51 in the second ears 54. Second ears 54 are fixedly attached, for example by welding, to first and second tubes 56, 58 which form part of the sliding assembly, explained below. Attached to the fixed leg 26 is a second floor plate 60 of substantially rectangular configuration. The second floor plate 60 includes holes for accepting fasteners such as bolts so that the plate may be secured to the floor where the seat is to be installed.

In accordance with the invention, the seat base 22 and the fixed leg 26 are interconnected in a manner which permits the base to slide relative to the support member in a first plane and pivot from a first plane to a second plane substantially perpendicular to the first plane. In the preferred embodiment this is achieved by a bracket assembly which includes a sliding assembly and a pivoting assembly. The bracket assembly is connected to the fixed leg 26 and the base 22 to permit the seat base to slide relative to the fixed leg 26 and to permit the seat base to pivot relative to the fixed leg 26. As embodied herein and shown in FIGS. 4, 6, 7, and 8 a bracket assembly includes a sliding assembly comprising first and second hollow tubes 56, 58, a means for biasing, and a system for locking the sliding assembly, explained below. Support bar 72 connects the first and second tubes 56, 58 and also cooperates with the second lateral bar 52 and torsion springs 74, explained below. The first and second tubes 56, 58 each have one of the second ears 54 fixed to it, as pointed out above, for rotatably holding the second lateral bar 52 of fixed leg 26. The first tube 56 further includes a second aperture 78 proximate to its end adjacent the fixed leg 26 which forms part of the locking system. First and second rods 46, 48 slidably reside in first and second tubes 56, 58, respectively. Each of the first and second tubes 56, 58 have a pair of bronze bushings (not shown) press fit to line the internal part of the tubes 56, 58 to aid in a smooth sliding motion between the tubes and the rods. As a result, the bracket assembly is pivotally connected to fixed leg 26 and is slidably connected to the seat base.

The sliding assembly includes means for biasing the base 22 to slide toward the fixed leg 26. As shown in FIGS. 1–7, two coiled springs 66 are positioned around the first and second rods 46, 48 respectively. The springs 66 are compressed in the region between bands 64 in the first embodiment (FIGS. 1–4) or support beams 65 in the second embodiment (FIG. 7) which act as stops for the springs 66 on one end, and the first and second tubes 56, 58, acting as stops on the opposite end. It should be understood that the sliding assembly could use any variety of biased rods and brackets, such as tension rods or the like. For example, the springs 66 could be replaced with a battery driven automotive type electric cylinder attached to the fixed leg 26 and the first or second rod 46, 48. Upon actuating the cylinder, the cylinder piston would cause the first and second rods 46, 48 to slide within the first and second tubes 56, 58 away from the fixed leg 26.

The sliding assembly includes systems for locking the sliding assembly in a position relative to the seat base. Two different embodiments of such systems are disclosed. In the embodiment shown in FIGS. 4, 6, and 8, the sliding assembly includes a generally elongated push bar 68 pivotably connected to support bar 72 by a first linkage 80 through a swivel bolt 69. The push bar 68 is generally straight in configuration, bending out at an obtuse angle α at the end proximate to the fixed leg 26. Pivotably connected at the bent out end of the push bar 68 is a pin 70. A side of a hollow cylinder 71 is fixed to the end of the support bar 72, and one end of the cylinder 71 is fixed to the first tube 56 so that the end of the cylinder 71 is aligned with a second aperture 78 formed in the first tube 56. A second linkage 82 connects the cylinder 71 to the first member 80 for support. The pin 70 slidably resides within the cylinder 71 and is biased by a spring 73 through the second aperture 78 and toward the first rod 46. The push bar 68 is attached to the support bar 72 such that the push bar extends along the length from approximately adjacent the fixed leg 26 to approximately adjacent the pivotable leg 24. The push bar 68 is positioned so that the pin 70 is with the second aperture 78 in the first tube 56. The pin 70 is biased toward the second aperture 78 so that the pin 70 slidably resides in the second aperture. The first rod 46 defines a first aperture 76 at a point approximately one third of the distance from the side edge of the frame 21 adjacent the fixed leg 26.

Figure 8:
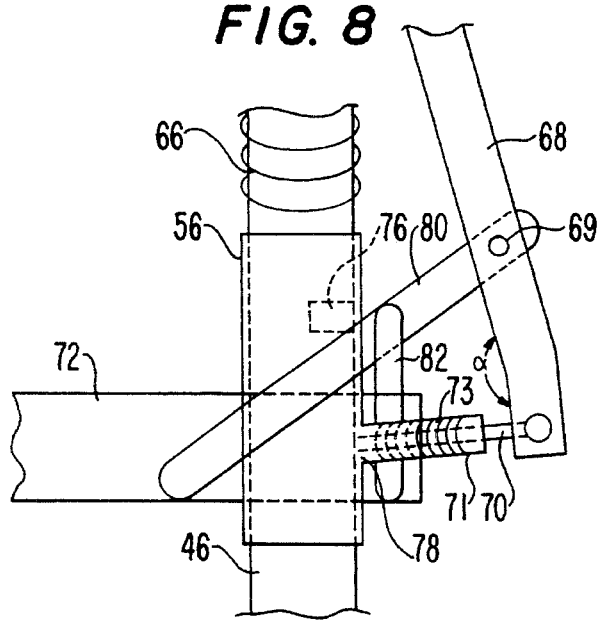
FIG. 8 is an enlarged fragmentary cross-section of the portion within the sight circle 8—8 of FIG. 4.

For the first embodiment, in operation of the sliding assembly and the locking system and as shown in FIG. 5, when the base 22 is in a first position with the pivotable leg 24 locked into the first floor plate 38, the first and second rods 46, 48 are positioned relative to the first and second tubes such that the first aperture 76 of the first rod 46 is aligned with the second aperture 78 of the first tube 56. The pin 70 is biased inwardly by the spring 73 so that the pin 70 rests in the first and second apertures 76, 78. The springs 66 are compressed between the bands 64 and the first and second tubes 56, 58. When the pivotable leg 24 is unlocked from the first floor plate 38, the push bar 68 may be pushed on the end opposite to the pin 70. This causes the first and second linkages 80, 82 to pivotably pull the pin 70 out of the first aperture 76. The springs 66 then push against the first and second tubes 56, 58 to push the bands 64. This slides the first and second rods 46, 48 through the first and second tubes 56, 58 laterally away from the fixed leg 26. Hence, the base 22 also slides in a direction away from the fixed leg 26. FIG. 8 shows the first rod 46 and first aperture 76 relative to the first tube 56 after the rod 46 has been released from the lock of the pin 70. When the base 22 is pushed against the spring 66, that is, back toward the direction of the fixed leg 26, the first rod 46 is moved relative to the first tube 56 until the first aperture 76 of the first rod is once again aligned with the second aperture 78 of the first tube 56. The pin 70 is biased inwardly by the spring 73 to rest in the first aperture 76, securing the position of the base 22 relative to the fixed leg 26.

Figure 9:
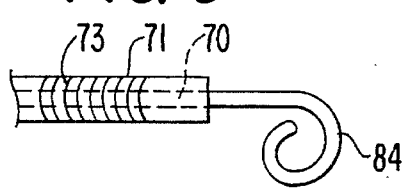
FIG. 9 is a side elevation view of a part of the present invention.

In a second embodiment, as shown in FIGS. 7 and 9, the push bar 68 is replaced by a pull ring 84. The pull ring 84 includes one end for accommodating an operator's finger and an opposite end terminating in the pin 70. As in the first embodiment, a cylinder 71 is fixed on its side to the support bar 72 and attached on one hollow end to the first tube 56. The pin 70 is biased by a spring 73 to project toward the second aperture 78 in the first tube 56. To operate, the base 22 is slid toward the fixed leg 26 to align the first aperture 76 of the first rod 46 with the second aperture 78 and the biased pin 70, so that the pin 70 is biased through the first aperture 76. To release the base from this position, the pull ring 84 is pulled outwardly in a direction against the bias of the pin 70 to remove the pin 70 from the first aperture 76. The springs 66 then push against the first and second tubes 56, 58 to push the support beams 65. This slides the first and second rods 46, 48 through the first and second tubes 56, 58 laterally away from the fixed leg 62.

FIGS. 1 and 5 show the storable seat 20 mounted proximate to a wall 110. The presence of walls in buses, vans, or the like usually put significant limitations on the design of a storable seat, e.g., set-up time, comfort considerations, etc. The inventors have discovered that the sliding assembly, in combination with the other features of the invention, alleviate many of the problems introduced by the presence of a wall. For example, a thicker and more comfortable cushion may be installed on the base 22 because the sliding assembly allows for more pivot room when pivoting the seat up against the wall. The sliding assembly also allows for a close, tight fit against the wall both in its seating position and in its stored position, allowing for a more efficient use of space. In addition, the set-up time is short because it involves only a push of the push bar 68 or a pull of the pull ring 84 to release the pin 70 and allow the base 22 to slide away from the wall 110.

The pivoting assembly pivots the seat from a position substantially horizontal to the floor to a vertical position. As embodied herein and shown in FIGS. 4, 6, and 7, the pivoting assembly includes tubes 56, 58, support bar 72, and ears 54 which are pivotably connected to lateral bar 52 of fixed leg 26. Keyed to the second lateral bar 52 are the torsion springs 74 which are positioned to press the support bar 72 in a direction up and away from the floor. In operation, when a user pivots the seat base 22 from a position substantially parallel to the floor to a vertical position, the torsion springs 74 aid the user in the pivoting motion by pushing on the support bar 72. As such, the seat base 22 pivots about the fixed leg 26 through rotation of the second lateral bar 52 in the second ears 54. Other ways to aid in the pivoting motion could be used as well. For example, a variety of biasing members could be used to aid in pivoting, such as a battery driven 12 volt automotive type electric cylinder. The electric cylinder base could be connected to the fixed leg 26, with a piston rod connected to about the middle of the base 22 so that when the cylinder is actuated, the piston rod slides out of the cylinder and pivots the base 22 toward its vertical position. It should be understood that the seat 20 is pivotable without any biasing devices whatsoever.

In accordance with the invention, a seat back is pivotably connected to the seat base. As embodied herein and as shown in FIGS. 2, 3, 7 and 10, a seat back 86 is connected to the base 22 through a seat hinging assembly shown generally as 88. The seat hinging assembly comprises a generally circular plate 90 including first and second notches 92, 94 and a finger 96 extending from the circular plate 90. The finger 96 is fixedly attached to the seat back 86 by a bolt or any suitable fastener. The circular plate is swivellably fastened to an upright 98, which is bolted to the frame 21. The upright 98 defines a hollow slot 99 for slidably holding a shoe 104. The shoe 104 is attached to a rectangular body 102 of a lever 100. The lever 100 is pivotably attached to the first upright 98 and positioned below the circular plate 90. The lever 100 pivots so that the shoe 104 rests in the first notch 92 when the seat back 86 is in an upright position. A spring 106 extends between a notch in the upright 98 and a hole in the lever 100 so that the shoe is always biased toward the circular plate 90 and into one of the notches 92 or 94. It is to be understood that the seat back 86 is attached to the base 22 by assembly 88 on both sides of the seat back 86. However, only one assembly 88 includes a lever 100 and spring 106. The pivoting seat back could use any variety of hinges to allow the seat back to move from an upright position to a folded position.

Figure 10:
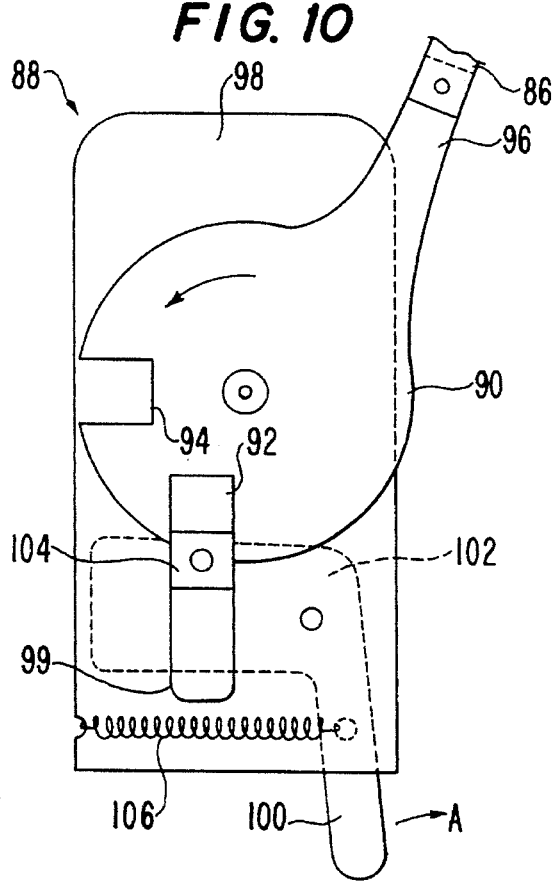
FIG. 10 is a side elevation view of a subassembly of the present invention.

To operate the seat hinging assembly 88 and pivot the seat back 86 from an upright position, as shown in FIGS. 1, 2, and 7, to a folded position, as shown in FIGS. 3 and 5, the lever 100 is pivoted in the direction A shown in FIG. 10. This pivots the body 102 to move the shoe 104 out of the first notch 92 and permits the seat back 86 to pivot downwardly onto the base 22. When the seat back 86 pivots toward the base 22, the circular plate 90 rotates counterclockwise, as seen in FIG. 10, until the second notch 94 is proximate to the shoe 104. The spring 106 biases the lever 100 to its original position, thereby urging the shoe 104 toward the plate 90 and into the second notch 94. This locks the seat back 86 in a folded down position, shown in FIGS. 3 and 5.

The storable seat 20 operates as follows: In a first position suitable for seating a person, the seat 20 is in the position shown in FIGS. 1 and 2. That is, the pivotable leg 24 is locked into the first floor plate 38, the seat back 86 is in an upright position, and the pin 70 is penetrating the first aperture 76 of the first rod 46 so that the base is locked relative to the fixed leg 26. To store the seat to a position parallel and adjacent to the wall 110, the lever 100 is pivoted toward the rear of the seat so that the seat back 86 is pivoted to rest on top of the base 22, as shown in FIG. 3. Next, the foot actuator 42 is depressed which lifts the spring biased plunger 40 out of the slots 36. The operator lifts the pivotable leg 24 out of the first floor plate 38. To slide the seat 20 away from the wall 110 to a second position, as shown in shadow in FIG. 5, the operator pushes on the push bar 68 (FIGS. 1–6 and 8) or pulls the pull ring 84 (FIGS. 7 and 9). The pushing motion on the push bar 68 causes the first and second linkages 80, 82 to pivotably pull the pin 70 out of the first aperture 76 of the first rod 46. The springs 66 push against the first and second tubes 56, 58 to push the bands 64. This slides the base 22 laterally away from the wall 110 to the second position further away from the wall 110. To pivot the seat 20 up against the wall 110 to a third position shown in FIG. 4, the operator lifts the end proximate to the pivotable leg 24. The torsion springs 72 aid in lifting the seat 20 to pivot about the second hinge points 54 from its horizontal position parallel to the floor 28 to its vertical position parallel to the wall 110. To put the seat 20 in a fourth position, as shown in FIG. 6, the base 22 is pushed downwardly, so that the first and second rods 46, 48 slide within the first and second tubes 56, 58 and compress the springs 66 between the bands 64 and the tubes 56, 58. The base 22 is pushed in this direction until the first aperture 76 in the first rod 46 is aligned with the second aperture 78 and the pin 70. The pin 70 is biased by spring 73 to penetrate the first aperture 76, thereby locking the seat 20 in the fourth position. Finally, the pivotable leg 24 is pivoted from a position perpendicular to the base 22 shown in FIG. 4, to a position parallel to the base 22, shown in FIG. 6 by pushing the arm member 122 toward the direction of the first lateral bar 44. This motion pulls each of the pins 120 of the arm member 122 against the bias of the spring 118 and out of the first bore 112 of the first tubular bar 44. The operator then rotates the pivotable leg 124 toward the horizontal position until each of the pins 120 are respectively snapped into each of the second bores 114.

To unstore the seat, the above steps are performed in reverse order. That is, first the pivotable leg 24 is pivoted away from the base 22 by pushing on the arm member 122 and rotating the leg 24 until it snaps into its horizontal position. The push bar 68 is depressed toward the rear of the base 22, pulling the pin 70 out of the first aperture 76, and allowing the operator to slide the base 22 upwardly to the position shown in FIG. 4. The seat 20 is then pivoted down to the position shown in shadow in FIG. 5, against the compression of the torsion springs 74, but with the force of gravity. The seat 20 is pushed to slide the base 22 toward the wall 110 relative to the fixed leg 26. The base 22 is slid until the first aperture 76 lines up with the second aperture 78 and the pin 70, so that the pin 70 is biased by spring 73 into the first aperture 76. The pivotable leg 24 is locked in the first floor plate by engaging the narrow slots of the plates 34 into the T-slots 36. Finally, the seat back 86 is raised to its upright position by pulling the lever 100 to release the shoe 104 from the second notch 94 and pivoting the seat back 86 toward its upright position until the shoe 104 engages the first notch 92.

It will be apparent to those skilled in the art that various modifications and variations can be made in the storable seat of the present invention and in construction of this without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A storable seat for selective placement on a floor and releasable storage against a wall, the seat comprising:

a seat base;

at least one support member to be mounted on the floor at a location adjacent to and spaced from the wall against which said seat is to be releasably stored, said support member being capable of supporting said base in a seating position in which said base is proximate to the wall and in a first plane;

a bracket assembly slidably and pivotably interconnecting said support member and said base, said bracket assembly permitting said base to be slid along said first plane in a linear direction from said seating position to a pivot position in which said base is spaced further from the wall and further permitting said base to also be pivoted about an axis perpendicular to said linear direction from said pivot position to a first storage position along the wall and in a second plane substantially perpendicular to said first plane and substantially parallel to the wall; and said bracket assembly further permits said base to be slid downwardly along said second plane from the first storage position to a second storage position more proximate to the floor than said first storage position.

2. The seat of claim 1 further comprising a seat back pivotably connected to said base.

3. The seat of claim 2 further comprising a locking mechanism to selectively hold said seat back in a locked position relative to said seat base and a release mechanism for unlocking said back and permitting said back to pivot to a third plane substantially parallel to the first plane.

4. The seat of claim 1 wherein the bracket assembly includes tubes that slidably accept a portion of said base.

5. The seat of claim 4 further comprising means for biasing the sliding of the base relative to the support member.

6. The seat of claim 1 wherein said support member includes a fixed leg which is capable of being fixedly mounted to the floor.

7. The seat of claim 1 further comprising a pivotable leg pivotably connected to said base.

8. The seat of claim 7 further comprising a floor plate to be mounted on the floor, said floor plate including means for selectively engaging and holding said pivotable leg.

9. The seat of claim 8 further comprising an actuator and a plunger for unlocking and disengaging said pivotable leg from said floor plate.

10. The seat of claim 8 wherein said bracket assembly is pivotally locked when said pivotable leg is locked into said floor plate.

11. The seat of claim 7 wherein the pivotable leg includes locking structure for selectively locking the pivotable leg in a first position substantially perpendicular to the base and in a second position substantially parallel to the base.

12. The storable seat of claim 1 wherein said bracket assembly slidably receives said base and pivotably is attached to said support member.

13. The seat of claim 1 further comprising means for selectively locking said seat in said seating and second storage positions.

14. The seat of claim 1 further comprising means for biasing the sliding of said base member along the first plane away from the wall.

15. The seat of claim 1 further comprising means for biasing the pivoting of said base member from said first plane to said second plane.

16. A floor mounted seat for releasably storing against a wall, the seat comprising:

a seat base;

at least one support member for supporting said base in a first plane above and parallel to a floor, said support member to be mounted on the floor at a position adjacent to and spaced from the wall against which said seat is to be releasably stored;

at least one leg pivotably connected to said base and supporting said base in the first plane, said at least one leg being pivotable from a down position when it is supporting said base above the floor to an up position proximate to said base;

a bracket assembly slidably and pivotably interconnecting said support member and said base, said bracket assembly permitting said base to be slid along said first plane in a linear direction from a seating position to a pivot position in which said base is spaced further from the wall, and further permitting said base to also be pivoted about an axis perpendicular to said linear direction from the pivot position in said first plane to a first storage position in a second plane substantially perpendicular to said first plane and substantially parallel to the wall said bracket assembly further permitting said base to be slid downwardly along said second plane from said first storage position to a second storage position more proximate to the floor than said first storage position.

17. The seat of claim 16 further comprising a floor plate mounted on the floor and means for selectively locking said at least one leg to said floor plate.

18. The storable seat of claim 17 wherein said bracket assembly slidably receives said base and pivotably is attached to said support member.

19. The storable seat of claim 18 wherein said bracket assembly includes a pair of parallel tubes that slidably receive portions of said base member and that are pivotably connected to said support member.

20. A storable seat for selective placement on a floor and releasable storage against a wall, the seat comprising:

a seat base;

at least one support member to be mounted on the floor at a location adjacent to and spaced from the wall against which said seat is to be releasably stored, said support member being capable of supporting said base in a seating position in which said base is proximate to the wall and in a first plane;

a bracket assembly slidably and pivotably interconnecting said support member and said base, said bracket assembly permitting said base to be slid along said first plane in a linear direction from said seating position to a pivot position in which said base is spaced further from the wall and further permitting said base to also be pivoted about an axis perpendicular to said linear direction from said pivot position to a first storage position along the wall and in a second plane substantially perpendicular to said first plane and substantially parallel to the wall;

said bracket assembly further permits said base to be slid downwardly along said second plane frown the first storage position to a second storage position more proximate to the floor than said first storage position; and means for selectively locking said seat in said seating and second storage positions.

* * * * *